US012111832B2

(12) United States Patent
Kavali et al.

(10) Patent No.: US 12,111,832 B2
(45) Date of Patent: Oct. 8, 2024

(54) TECHNIQUES FOR A DETERMINISTIC DISTRIBUTED CACHE TO ACCELERATE SQL QUERIES

(71) Applicant: Oracle International Corporation, Redwood Shores, CA (US)

(72) Inventors: Devarajulu Kavali, Santa Clara, CA (US); Aneesh Malkhed, Bangalore (IN); Sounak Chakraborty, Bangalore (IN); Harish Ramesh Butani, San Jose, CA (US); Vivek Bhaskar, Pune (IN); Sandeep Akinapelli, Fremont, CA (US); Devaraj Das, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 224 days.

(21) Appl. No.: 17/349,813

(22) Filed: Jun. 16, 2021

(65) Prior Publication Data

US 2022/0374431 A1    Nov. 24, 2022

(30) Foreign Application Priority Data

May 21, 2021    (IN) .............................. 202141022725

(51) Int. Cl.
*G06F 16/2453*    (2019.01)
*G06F 16/2455*    (2019.01)

(52) U.S. Cl.
CPC .. *G06F 16/24539* (2019.01); *G06F 16/24552* (2019.01)

(58) Field of Classification Search
CPC ......... G06F 16/24544; G06F 16/24537; G06F 16/2237; G06F 16/2456
See application file for complete search history.

(56) References Cited

U.S. PATENT DOCUMENTS 10,152,425 B2 * 12/2018 Moyer ................ G06F 12/0891
10,209,893 B2    2/2019 Barton et al.
(Continued)

OTHER PUBLICATIONS

Yang et al., "SHC: Distributed Query Processing for Non-Relational Data Store" teaches "a housekeeping thread performing the lazy deletion policy, p. 1471" (Year: 2018).*

(Continued)

*Primary Examiner* — Mark D Featherstone
*Assistant Examiner* — Kweku William Halm
(74) *Attorney, Agent, or Firm* — Kilpatrick Townsend & Stockton LLP

(57) ABSTRACT

Techniques for providing improved distributed caching are disclosed. A distributed computing system can be implemented with a cluster including a plurality of worker nodes configured to host one or more executors for processing data related to a query. The worker nodes can host a cache accessible to the executors. The data can be processed as a plurality of data segments. The worker nodes can be uniformly assigned a plurality of token bounds defining a range of integer token values. A hashing algorithm can be used to compute a token for each data segment associated with the query. Tasks can be launched on the executors preferentially, such that the task for processing a data segment having a token within the token bounds associated with the preferred executor. Executors can be instructed to review the associated cache to identify outlier data segments and inform other nodes in the cluster.

20 Claims, 11 Drawing Sheets

(56) References Cited

U.S. PATENT DOCUMENTS

| | | | |
|---|---|---|---|
| 10,528,596 B2 | 1/2020 | Shivarudraiah et al. | |
| 2013/0304823 A1* | 11/2013 | Sato | H04L 67/1065 709/204 |
| 2015/0149581 A1* | 5/2015 | Brown | H04L 67/568 709/217 |
| 2015/0309933 A1* | 10/2015 | Nellans | G06F 3/0679 711/103 |
| 2019/0102418 A1* | 4/2019 | Vasudevan | G06F 16/27 |
| 2020/0065303 A1* | 2/2020 | Bhattacharjee | G06F 16/278 |
| 2020/0073823 A1* | 3/2020 | Kourtis | G06F 12/0253 |
| 2020/0278931 A1* | 9/2020 | Bavishi | G06F 12/0891 |
| 2020/0349076 A1* | 11/2020 | Dropps | G06F 12/0817 |

OTHER PUBLICATIONS

International Application No. PCT/US2022/030337, International Search Report and Written Opinion mailed on Sep. 5, 2022, 13 pages.

Yang et al., SHC: Distributed Query Processing for Non-Relational Data Store, 2018 IEEE 34th International Conference on Data Engineering (ICDE), Apr. 16, 2018, pp. 1465-1476.

Singh, Vivek Kumar, "Consistent Hashing," Retrieved from Internet: https://medium.com/system-design-blog/consistent-hashing-b9134c8a9062, Access from Internet on Apr. 23, 2021, 8 pages.

Gryski, Damian, "Consistent Hashing: Algorithmic Tradeoffs," Retrieved from Internet: https://dgryski.medium.com/consistent-hashing-algorithmic-tradeoffs-ef6b8e2fcae8, Access from Internet on Apr. 23, 2021, 12 pages.

Carzolio, Juan Pablo, "A Guide to Consistent Hashing," Retrieved from Internet: https://www.toptal.com/big-data/consistent-hashing, Access from Internet on Apr. 23, 2021, 20 pages.

Laskowski, Jacek, "Spark SQL—Structured Data Processing with Relational Queries on Massive Scale," Retrieved from Internet: https://jaceklaskowski.gitbooks.io/mastering-spark-sql/content/spark-sql.html, Access from Internet on Apr. 18, 2021, 6 pages.

Ambrust, Michael et al., "Deep Dive into Spark SQL's Catalyst Optimizer," Retrieved from Internet: https://databricks.com/blog/2015/04/13/deep-dive-into-spark-sqls-catalyst-optimizer.html, Access from Internet on Apr. 24, 2021, 8 pages.

\* cited by examiner

300 → hostTokenMap:
host_0 -> List(TokenBounds(357913941, 715827882),
              TokenBounds(1789569705, 2147483647)),
host_1 -> List(TokenBounds(0, 357913941),        ← 302
              TokenBounds(715827882, 1073741823)),  ← 304
host_2 -> List(TokenBounds(1431655764, 1789569705),
              TokenBounds(1073741823, 1431655764))

*FIG. 3A*

310 → hostTokenMap:
host_0 -> List(TokenBounds(357913941, 715827882),
              TokenBounds(1789569705, 2147483647),
              TokenBounds(0, 357913941))          ← 302
host_2 -> List(TokenBounds(1431655764, 1789569705),
              TokenBounds(1073741823, 1431655764),
              TokenBounds(715827882, 1073741823)) ← 304

*FIG. 3B*

TECHNIQUES FOR A DETERMINISTIC DISTRIBUTED CACHE TO ACCELERATE SQL QUERIES

CROSS-REFERENCES TO RELATED APPLICATIONS

The present application is a non-provisional of and claims priority and benefit from India Provisional Patent Application No. 202141022725, filed May 21, 2021, and entitled "TECHNIQUES FOR A DETERMINISTIC DISTRIBUTED CACHE TO ACCELERATE SQL QUERIES," the entire contents of which are incorporated herein by reference for all purposes.

BACKGROUND

Cloud-based services provide solutions for processing large volumes of data by any number of tenants. A cloud-based data processing service may be implemented by a distributed computing system that includes a suitable number of computing clusters containing nodes for performing operations to handle user requests. High performance data analytics services may process distributed data throughout the cluster based on interactive, near-real time queries from a user, but rely on slow retrieval of data segments from the global storage. A need exists for improved caching of data segments at the cluster nodes to increase the speed and efficiency of data processing for interactive queries.

BRIEF SUMMARY

Embodiments of the present disclosure relate to providing caching in a cloud computing environment. More particularly, some embodiments provide methods and systems that implement a distributed cache that is consistent across nodes in a distributed computing environment. The caching can be provided, in part, with a consistent hashing technique that allows for the configuration of a plurality of nodes in the distributed computing environment, each having an associated cache. One or more tasks executing on the nodes can share the associated cache but have ownership of unique data segments stored in the cache. The ownership may be based on the consistent hashing technique that computes a token for each data segment associated with a query processed by the distributed computing system. The correspondence between the tasks, the nodes, and the tokens for each data segment may allow for particular nodes to be identified as preferred nodes for the execution of tasks, as determined by a query optimizer.

One embodiment is directed to a method performed by a distributed computing system providing an analytical data processing service. The method can comprise executing a cluster that includes a plurality of nodes. The distributed computing system can maintain a state of the cluster, with the cluster state including a plurality of token bounds uniformly associated with the plurality of nodes. Maintaining the cluster state can include storing a mapping of one or more executors to the plurality of nodes and assigning, based on the mapping, the plurality of token bounds to the one or more executors executing on the plurality of nodes. The method also includes receiving, by a driver node of the plurality of nodes, a query for execution. Based on the query, a set of one or more data segments corresponding to the query can be identified or determined. A set of tokens corresponding to the set of one or more data segments can be computed using a hash algorithm to determine hash values that uniquely identify the one or more data segments. The method also includes launching, on a first executor executing on a first worker node of the plurality of nodes, a first task to process a first data segment from the set of one or more data segments, the first worker node selected based at least in part on a first token of the set of tokens corresponding to a first pair of token bounds associated with the first worker node. Finally, the first worker node can obtain the data segment to be processed by the first task. The data segment may be present in a cache associated with the first worker node or may be present in a data store, database, object storage, or other repository remote from the node.

According to certain embodiments, the distributed computing system can receive an indication that the cluster has changed. For example, a node may become inoperative due to a hardware or software failure. The method can include maintaining the cluster state by updating the plurality of token bounds and assigning the updated token bounds uniformly to the one or more executors that are executing in the distributed computing system.

According to some other embodiments, the method can include obtaining the first data segment that is present in a second cache associated with a second worker node. In these embodiments, the first executor can determine that the first data segment is not present in the first cache associated with the first worker node. The first executor can transmit a request to one or more neighboring nodes of the plurality of nodes. Executors executing on the neighboring nodes can, based on the request, inspect caches associated with each of the neighboring nodes. A second executor executing on a second worker node of the one or more neighboring nodes can determine that the first data segment is present in the second cache, place that data segment in a block manager or other module configured to handle data transfer between nodes in the distributed computing system, and then transmit the identity of the first data segment to the first executor that made the request. The first worker node can then copy the data segment from the second worker node to the first cache associated with the first worker node.

In some embodiments, the method may include computing the plurality of token bounds using a hashing algorithm. The output of the computation can be integer values computed as a hash from identifying information from each data segment associated with the received query, for example the filename of the data segment. The hash value for each data segment can be a token corresponding to that data segment. The plurality of token bounds may include a plurality of integer values that partition a range of possible integer token values. Thus, each pair of token bounds defines a range of contiguous integer values that lie in between the values of the pair of token bounds.

In some other embodiments, the method can include operations to stabilize the distributed cache in the distributed computing system. The method may include transmitting a house keeping request to the first worker node, prompting the first executor to determine one or more outlier data segments present in the first cache associated with the first worker node. Outlier data segments within the cache are determined in part by whether the tokens associated with the segments fall within the token bounds assigned to the first executor. The first executor can then transmit the identifiers of the outlier data segments to all other nodes. A second worker node can then copy one or more of the outlier data segments from the first cache at the first worker node to a second cache at the second worker node.

In still other embodiments, the method can include operations to remove data segments from the distributed cache to preserve space and other resources. The method may include transmitting a house keeping request to the first worker node, prompting the first executor to determine a set of valid data segments and one or more invalid data segments present in the first cache. The one or more invalid data segments may be evicted from the first cache. The method can also include determining a current storage availability associated with the first worker node; if the current storage availability falls below a threshold, the first executor may determine, based on a set of segment temperatures, one or more target data segments present in the first cache. The one or more target data segments can then be evicted from the cache.

Another embodiment is directed to a distributed computing system including one or more processors and one or more memories storing computer-executable instructions that, when executed with the one or more processors, cause the distributed computing system to execute a cluster that includes a plurality of nodes. The distributed computing system can maintain a state of the cluster, with the cluster state including a plurality of token bounds uniformly associated with the plurality of nodes. Maintaining the cluster state can include storing a mapping of one or more executors to the plurality of nodes and assigning, based on the mapping, the plurality of token bounds to the one or more executors executing on the plurality of nodes. The instructions may also cause the distributed computing system to receive, by a driver node of the plurality of nodes, a query for execution. Based on the query, a set of one or more data segments corresponding to the query can be identified or determined. A set of tokens corresponding to the set of one or more data segments can be computed using a hash algorithm to determine hash values that uniquely identify the one or more data segments. The instructions may also cause the distributed computing system to launch, on a first executor executing on a first worker node of the plurality of nodes, a first task to process a first data segment from the set of one or more data segments, the first worker node selected based at least in part on a first token of the set of tokens corresponding to a first pair of token bounds associated with the first worker node. Finally, the first worker node can obtain the data segment to be processed by the first task. The data segment may be present in a cache associated with the first worker node or may be present in a data store, database, object storage, or other repository remote from the node.

According to certain embodiments, the distributed computing system can receive an indication that the cluster has changed. For example, a node may become inoperative due to a hardware or software failure. The instructions may also cause the distributed computing system to maintain the cluster state by updating the plurality of token bounds and assigning the updated token bounds uniformly to the one or more executors that are executing in the distributed computing system.

According to some other embodiments, the instructions may also cause the distributed computing system to obtain the first data segment that is present in a second cache associated with a second worker node. In these embodiments, the first executor can determine that the first data segment is not present in the first cache associated with the first worker node. The first executor can transmit a request to one or more neighboring nodes of the plurality of nodes. Executors executing on the neighboring nodes can, based on the request, inspect caches associated with each of the neighboring nodes. A second executor executing on a second worker node of the one or more neighboring nodes can determine that the first data segment is present in the second cache, place that data segment in a block manager or other module configured to handle data transfer between nodes in the distributed computing system, and then transmit the identity of the first data segment to the first executor that made the request. The first worker node can then copy the data segment from the second worker node to the first cache associated with the first worker node.

Another embodiment is directed to a non-transitory computer readable medium storing computer-executable instructions that, when executed by one or more processors, cause a computer system to execute a cluster that includes a plurality of nodes; maintain a state of the cluster, with the cluster state including a plurality of token bounds uniformly associated with the plurality of nodes; receive, by a driver node of the plurality of nodes, a query for execution; based on the query, determine a set of one or more data segments corresponding to the query; compute a set of tokens corresponding to the set of one or more data segments using a hash algorithm to determine hash values that uniquely identify the one or more data segments; launch, on a first executor executing on a first worker node of the plurality of nodes, a first task to process a first data segment from the set of one or more data segments, the first worker node selected based at least in part on a first token of the set of tokens corresponding to a first pair of token bounds associated with the first worker node; and obtain the data segment to be processed by the first task. The data segment may be present in a cache associated with the first worker node or may be present in a data store, database, object storage, or other repository remote from the node. Maintaining the cluster state can include storing a mapping of one or more executors to the plurality of nodes and assigning, based on the mapping, the plurality of token bounds to the one or more executors executing on the plurality of nodes.

According to certain embodiments, the distributed computing system can receive an indication that the cluster has changed. For example, a node may become inoperative due to a hardware or software failure. The instructions may also cause the computer system to maintain the cluster state by updating the plurality of token bounds and assigning the updated token bounds uniformly to the one or more executors that are executing in the distributed computing system.

According to some other embodiments, the instructions may also cause the computer system to obtain the first data segment that is present in a second cache associated with a second worker node. In these embodiments, the first executor can determine that the first data segment is not present in the first cache associated with the first worker node. The first executor can transmit a request to one or more neighboring nodes of the plurality of nodes. Executors executing on the neighboring nodes can, based on the request, inspect caches associated with each of the neighboring nodes. A second executor executing on a second worker node of the one or more neighboring nodes can determine that the first data segment is present in the second cache, place that data segment in a block manager or other module configured to handle data transfer between nodes in the distributed computing system, and then transmit the identity of the first data segment to the first executor that made the request. The first worker node can then copy the data segment from the second worker node to the first cache associated with the first worker node.

BRIEF DESCRIPTION OF DRAWINGS

FIG. 3A is a snippet of code showing an example mapping of token bounds to nodes within a cluster, according to some embodiments.

FIG. 3B is another snippet of code showing another example mapping of token bounds to an updated set of nodes within a cluster, according to some embodiments.

DETAILED DESCRIPTION

Figure 1:
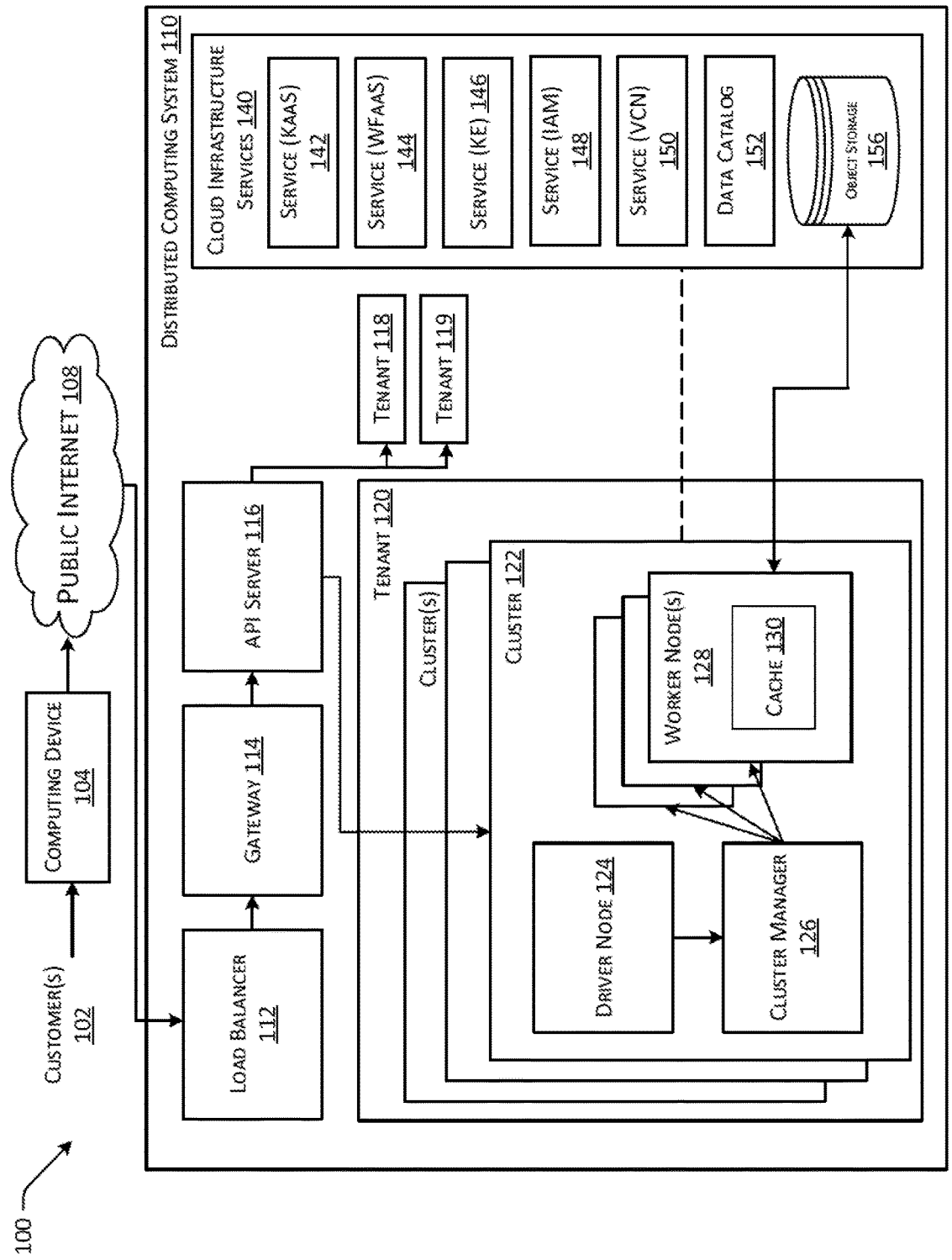
FIG. 1 depicts a distributed computing system in a cloud computing environment that includes distributed caching of data segments retrieved from an object storage system, according to some embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Distributed computing systems have become increasingly common for data analytics, with capabilities for providing fast, reliable, and scalable solutions for processing large volumes of data. Providing a distributed computing system in a cloud computing environment gives these data processing capabilities to multiple different customers (e.g., tenants) of the cloud computing environment. Recent developments in the distributed computing space, including robust query optimization, allow for processing of interactive queries on large data sets in near-real time, with a requesting user launching queries and expecting results at a user interface interactively. To ensure independent scalability, data storage and computing resources are decoupled in the cloud computing environment. This decoupling may lead to suboptimal performance when data is retrieved from storage for processing. Techniques disclosed herein are directed to methods, systems, and computer-readable storage medium for providing a deterministic distributed cache within a distributed computing system to improve performance of analytical data processing.

A distributed computing system may include a computing cluster of connected nodes (e.g., computers, servers, virtual machines, etc.) that work together in a coordinated manner to handle various requests (e.g., storage and retrieval of data in a system that maintains a database, queries, etc.) by any suitable number of tenants. As used herein, a "computing node" (also referred to as a "worker node" and/or simply "node") may include a server, a computing device, a virtual machine, or any suitable physical or virtual computing resource configured to perform operations as part of a computing cluster. For example, a computing cluster may include one or more master nodes (also referred to herein as a "driver node") and one or more worker nodes. In some embodiments, a driver node can perform any suitable operations related to task assignment corresponding to one or more worker nodes, load balancing, node provisioning, node removal, or any suitable operations corresponding to managing the computing cluster. A worker node may be configured to perform operations corresponding to tasks assigned to it by one or more driver nodes. For example, a worker node can perform data storage and/or data retrieval tasks associated with a database as part of a task assigned to it by a driver node.

Within a distributed computing system providing an analytic data processing service (e.g., an Online Analytical Processing (OLAP) service), data may be stored in an object storage data store, database, or similar "deep" or "offline" storage. Typically, object storage systems support infrequent access to data and include various non-volatile forms of memory, which can impose latency to operations that read and/or write data to the object storage. The data can be stored as segments of a larger data structure representing the data as in a multidimensional manner. The data segments may be compressed files that include a dictionary. The data segments may represent a smallest unit of data atomically handled and processed by the data processing service. To execute queries, data segments can be retrieved from the object storage and stored at a local file system or other memory associated with one or more nodes of the distributed computing system. The local copy of the data segments may constitute a distributed cache within the distributed computing system. Because each node in the system may have a cache that stores different sets of data segments, the techniques of the present disclosure provide techniques for consistent caching of data segments, stabilization of the cache in response to changes to the cluster, and appropriate handling of replication, among other features.

In some embodiments, a driver module (e.g., an Apache Spark® Thrift server) may operate on a driver node or master node of a cluster within a distributed computing system. The driver module may convert a user query (e.g., a SQL query) into smaller execution units called tasks. The tasks can be configured to be performed by one or more execution processes (also referred to as "executors") executing on one or more worker nodes in the cluster. Each task can correspond to the processing of one data segment by an executor. The driver module may optimize the execution of the query by, among other things, launching the tasks at preferred worker nodes whose executors may "own" (e.g., have an associated cache storing a cached copy) the data segment to which the task corresponds. In other words, previous query executions within the cluster (e.g., previous queries from a user in an interactive session) may result in particular data segments cached with particular worker nodes. Launching tasks at the preferred worker nodes may result in data segments retrieved from the associated cache.

In some embodiments, a driver node (via a driver module) may assign a set of token bounds to one or more worker nodes in the cluster. The token bounds can represent a partition of a set of integer values representing a set of token splits. For example, the integer values can be the integers from 0 to $2^{31}-1$ (that is to say, the size of a 32-bit signed integer). The token bounds can be determined based at least in part on the state of the cluster, including the number of worker nodes and the number of executors configured to operate on the worker nodes. As an example, for a cluster with three worker nodes hosting two executors each, the token bounds can partition the set of integer values into six contiguous subsets of token splits. The driver node can assign the token bounds to the worker nodes in accordance with the number of executors configured for each worker node. If the state of the cluster changes (e.g., nodes are added or removed), the driver node can determine updated token bounds and assign the updated token bounds to the worker nodes according to the change in the cluster state. In some other embodiments, the driver node may receive an indication that a worker node has failed and assign the token bounds previously assigned to that worker node to one or more worker nodes remaining in the cluster. Unlike conventional consistent hashing techniques, which may use a ring like structure to assign token splits to the next node in the ring when a node fails, techniques of the present disclosure may distribute token bounds to the worker nodes uniformly and may attempt to maintain that uniform distribution throughout the lifetime of the cluster.

To schedule tasks within the nodes of the cluster, in some embodiments the driver node may compute tokens for the data segments to be processed in response to a query. The tokens can be hash values computed based upon unique segment keys or segment identifiers (e.g., file name, etc.). The hash values may be mapped to particular worker nodes by looking up the values in the range of the assigned token bounds. The corresponding worker node may be a preferred node for the task, such that a scheduler process responsible for launching the tasks may preferentially place the tasks on the preferred node. The executor processing the task may then retrieve the data segment from a cache associated with the worker node or, if the data segment is not present in the cache, retrieve the data segment from another node or from object storage. Once the data segment is in the cache of the preferred worker node, subsequent tasks that process that data segment may be launched on the preferred worker node and have a higher likelihood of a cache hit for the data segment.

According several embodiments, caches associated with one or more worker nodes within a cluster may be consistently maintained using various housekeeping techniques. Housekeeping methods may include both active and passive techniques for updating one or more of the caches. In response to any change in the state of the cluster (e.g., addition or removal of a node, node failure, addition or removal of executors, etc.), a driver node within the cluster may send an instruction to all executors within the cluster to scan the caches associated with the worker nodes hosting the executors. Since the driver node can assign updated token bounds to the worker nodes when the cluster state changed, data segments stored in the caches may correspond to a different worker node. In response to the housekeeping request, the executors identify these outlier data segments, pass them to a block manager or other process configured to transfer data between the worker nodes, and transmit identifiers of the outlier data segments to all other executors in the cluster. The executors can then retrieve outlier data segments to store in the local cache.

In some other embodiments, housekeeping methods can include operations that occur based on a timer. Over time, cached data segments can become invalid as modifications to the data segment in the object storage are committed to the object storage. Additionally, memory resources assigned to each worker node may be limited. Based on a timer, the driver node may send an instruction to the executors in the cluster to, among other operations, evict invalid data segments from their caches, transfer and evict outlier data segments, and evict data segments that are accessed from the cache infrequently in order to preserve space availability in the cache.

Maintaining a deterministic distributed cache provides numerous advantages over conventional techniques. As mentioned briefly above, typical consistent hashing techniques may have poor load balancing in the event of a node failure. Tokens mapped to the failed node may be re-mapped to a single node without evaluating the current load on the single node. The techniques described herein attempt to maintain a uniform distribution of tokens among all executors in the cluster in response to changes in the cluster state. In this way, query execution speed is preserved by not overloading a single node when a node is lost. Assigning token bounds to the worker nodes to create preferred nodes for the execution of tasks may limit duplication of cached data segments in the cluster, since the node preference can help launch repeated tasks with the same data segment on the preferred node instead of other nodes in the cluster that may require copying the data segment from the preferred node's cache or from the object storage. In addition, executors in the cluster can communicate with other executors to check whether neighboring nodes have cached data segments before retrieving segments from object storage, improving the speed and efficiency of query execution by reducing the number of retrievals from deep storage.

FIG. 1 depicts a distributed computing system 110 in a cloud computing environment 100 that includes distributed caching of data segments retrieved from an object storage system, according to some embodiments. The distributed computing system 110 may be implemented by one or more computing systems that execute computer-readable instructions (e.g., code, program) to implement the distributed computing system. As depicted in FIG. 1, the distributed computing system 110 includes various systems including a load balancer 112, a gateway 114 (e.g., a multi-tenant gateway), an Application Programming Interface (API) server 116, and one or more computing cluster(s) 122. Portions of data or information used by or generated by the systems shown in FIG. 1 may be stored on the object storage system 156. The systems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The distributed computing system 110 may be implemented in various different configurations. In the embodiment shown in FIG. 1, the distributed computing system 110 may be implemented on one or more servers of a cloud provider network and its data processing and data analytics services may be provided to subscribers of cloud services on a subscription basis. The computing environment 100 comprising the distributed computing system 110 depicted in FIG. 1 is merely an example and is not intended to unduly limit the scope of claimed embodiments. One of ordinary skill in the art would recognize many possible variations, alternatives, and modifications. For example, in some implementations, the distributed computing system 110 can be implemented using more or fewer systems than those shown in FIG. 1, may combine two or more systems, or may have a different configuration or arrangement of systems.

In some embodiments, a computing cluster (e.g., cluster 122) may represent a distributed computing engine for processing and analyzing large amounts of data for a tenant or customer of the distributed computing system 110. Different computing clusters may be associated with a tenant. For instance, in the embodiment shown in FIG. 1, the computing cluster(s) 122 are associated with a tenant 120 of the distributed computing system. One or more different computing clusters may be associated with additional tenants, for example tenants 118, 119. A cluster may be configured to perform operations in a coordinated fashion utilizing any suitable number of computing nodes. As previously noted, a "computing node" (also referred to herein as a "node") may include a server, a computing device, a virtual machine, or any suitable physical or virtual computing resource configured to perform operations as part of the computing cluster. By way of example, a cluster 122 may include a plurality of nodes including a driver node 124 and one or more worker node(s) 128, both being examples of computing nodes. In some embodiments, the driver node 124 performs any suitable operations related to task assignment corresponding to the worker nodes, such as load balancing, node provisioning, node removal, or any suitable operations corresponding to managing the cluster 122. One or more worker node(s) 128 is configured to perform operations corresponding to tasks assigned to it by the driver node 124. As a non-limiting example, worker node(s) 128 can perform data storage and/or data retrieval tasks associated with a storage system/database at the behest of the driver node 124 that assigns the worker node(s) 128 a particular storage or retrieval task.

Resources allocated to a tenant of the distributed computing system are selected from a plurality of cloud based resources that are arranged in a hierarchical manner. For instance, as shown in FIG. 1, the resources can be a pool of cloud infrastructure services 140. The cloud infrastructure services 140 can include key-value database as a service (KaaS) 142, workflow as a service (WFaaS) 144, Kubernetes engine (KE) 146, identity and access management (IAM) services 148, virtual cloud network (VCN) 150, and a data catalog 152.

According to some embodiments, the driver node (e.g., driver node 124) in a computing cluster (e.g., cluster 122) may be configured to execute a driver program (also referred to as a driver module, driver process, or simply driver, i.e., the process running an application that is built on the computing cluster) and may execute operations to create the application's context. An "application" may refer to a complete, executable driver program that is run as an independent process and coordinated by the application's context in the driver program executed in the driver node 124. The application's context may connect to a cluster manager 126 which allocates system resources to all the nodes in the cluster. Each worker node (e.g., worker node(s) 128) in the cluster 122 may be managed by one or more executors which may be processes (execution engines) launched on the worker node(s) 128 to perform operations corresponding to a task assigned to the node. The application code is sent from the driver program to the executors, and the executors specify the context and the various tasks to be run. The executors communicate back and forth with the driver program for data sharing or for interaction. The executors may additionally perform operations related to managing the computation as well as the storage and caching of data on the nodes. In a certain implementation, a computing cluster may be implemented using a distributed computing engine (e.g., Apache Spark) and the cluster manager 126 within a computing cluster may be implemented using a container orchestration platform such as Kubernetes or another cluster management solution such as Mesos or YARN.

In some embodiments, portions of data or information used by or generated by the computing clusters shown in FIG. 1 may be stored on one or more storage systems of the distributed computing system 110. In the embodiment depicted in FIG. 1, the storage systems include an object storage system 156. The object storage system 156 may represent a deep storage or offline storage system for storing data that is used, analyzed, and processed by the different computing clusters associated with the different tenants of the distributed computing system 110. By way of example, the object storage system 156 may represent a type of storage system that uses object-based storage to store data by managing and manipulating data as distinct units, referred to as objects. The object storage system 156 may be used for offline storage and/or archiving of data (e.g., used for backups or long-term storage, with infrequent access to data).

In a particular embodiment, the data processed by the computing clusters may be represented and stored in the object storage system as "data cubes." A "data cube" may refer to a data structure that may be used to represent data along some measure of interest such as two-dimensional, three-dimensional, or a higher-dimensional representation. A data cube can store large amounts of data while also providing users with searchable access to any data points and can be queried to provide real-time results. In certain examples, at runtime, a computing cluster may cache data cube indices in part or in whole as one or more data segments in cache memory (e.g., cache 130) of the computing nodes that form a computing cluster or store the segments on attached secondary storage (e.g., Random Access Memory (RAM), Solid State Drives (SSD) or Hard Disk Drives (HDD)) associated with the computing nodes. As used herein a "data segment" may refer to an individual dimension of the data cube that can be filtered and analyzed to provide detailed results to a customer/tenant of the distributed computing system 110.

In some embodiments, the distributed computing system 110 may be configured to determine the placement of data segments on the various computing nodes that make up a cluster. The placement of data segments on specific computing nodes in a cluster enables faster retrieval of data segments when particular data segments have to be read by the nodes of the computing cluster. Various approaches may be used by the distributed computing system 110 to determine the placement of data segments on the various computing nodes that make up a cluster. For instance, in approaches described herein, the distributed computing system 110 may utilize a particular hashing strategy to identify the node that may process a particular set of data segments. When a query is submitted by a user (e.g., customer(s) 102) of the distributed computing system 110, a driver node (e.g., driver node 124) within a cluster (e.g., cluster 122) may be configured to identify (e.g., using a consistent hashing strategy) the worker node (e.g., worker node 128) that stores the data segments that can be used to execute the query and then transmits the query to the worker node for execution.

In certain embodiments, a user (e.g., a customer 102) may interact with the distributed computing system 110 via a computing device 104 that is communicatively coupled to the distributed computing system 110 possibly via a public network 108 (e.g., the Internet). The computing device 104 may be of various types, including but not limited to, a mobile phone, a tablet, a desktop computer, and the like. A user may interact with the cloud computing system using a console user interface (UI) (which may be a graphical user interface (GUI)) of an application executed by the computing device or via API operations provided by the distributed computing system 110. For instance, the user may interact with the distributed computing system 110 to create one or more computing clusters, run interactive queries against pre-existing data stored in the storage systems, and retrieve results as a result of the query processing.

As an example, a user associated with tenant 120 of the distributed computing system 110 may interact with the distributed computing system 110 by transmitting a request to the distributed computing system 110 to create one or more clusters, including cluster 122. The create cluster request may be received by a load balancer 112 in the distributed computing system 110 which may transmit the request to a multi-tenant proxy service, for example gateway 114, within the distributed computing system. The gateway 114 may be responsible for authenticating/authorizing the user's request and routing the request to an API server 116 that may be configured to execute operations for creating the computing cluster. In certain examples, the gateway 114 may represent a shared multi-tenant Hyper Text Transfer Protocol (HTTP) proxy service that authorizes the user and submits the user's request to the API server 116 to enable the creation of a computing cluster for the tenant. In certain examples, and as previously described, the creation of a cluster may involve creating a pool of nodes comprising a driver node and a set of worker nodes. One or more clusters may be created under a dedicated subnet for the tenant. Thus, the distributed computing system 110 includes capabilities for providing isolation between computing clusters that belong to different tenants, for example tenants 118, 119.

In order to accelerate query processing and execution within the cluster, the cluster 122 within the distributed computing system 110 may include capabilities to cache the data required for computation of queries in-memory (also referred to herein as "cache memory" or a "cache") in the different nodes of the cluster. For instance, the cache (e.g., cache 130) may represent a small amount of dynamic random access memory (DRAM) which is very fast and expensive, located close to the central processing unit of the computing node. In certain embodiments, the nodes within a cluster are provided with improved capabilities to perform the efficient processing and analysis of data within a cluster by retrieving cached data, including, for example, cached data segments, from the caches associated with the nodes. In particular, if a worker node in the cluster is assigned a task for execution and does not have the associated data segment in cache, the worker node can determine a neighboring node within the cluster that has the data segment in cache and retrieve the segment from the neighboring node instead of retrieving the data segment from object storage 156. Additional details of the operations performed by the nodes to retrieve and maintain data segments in their associated caches is described in detail in FIG. 2.

Figure 2:
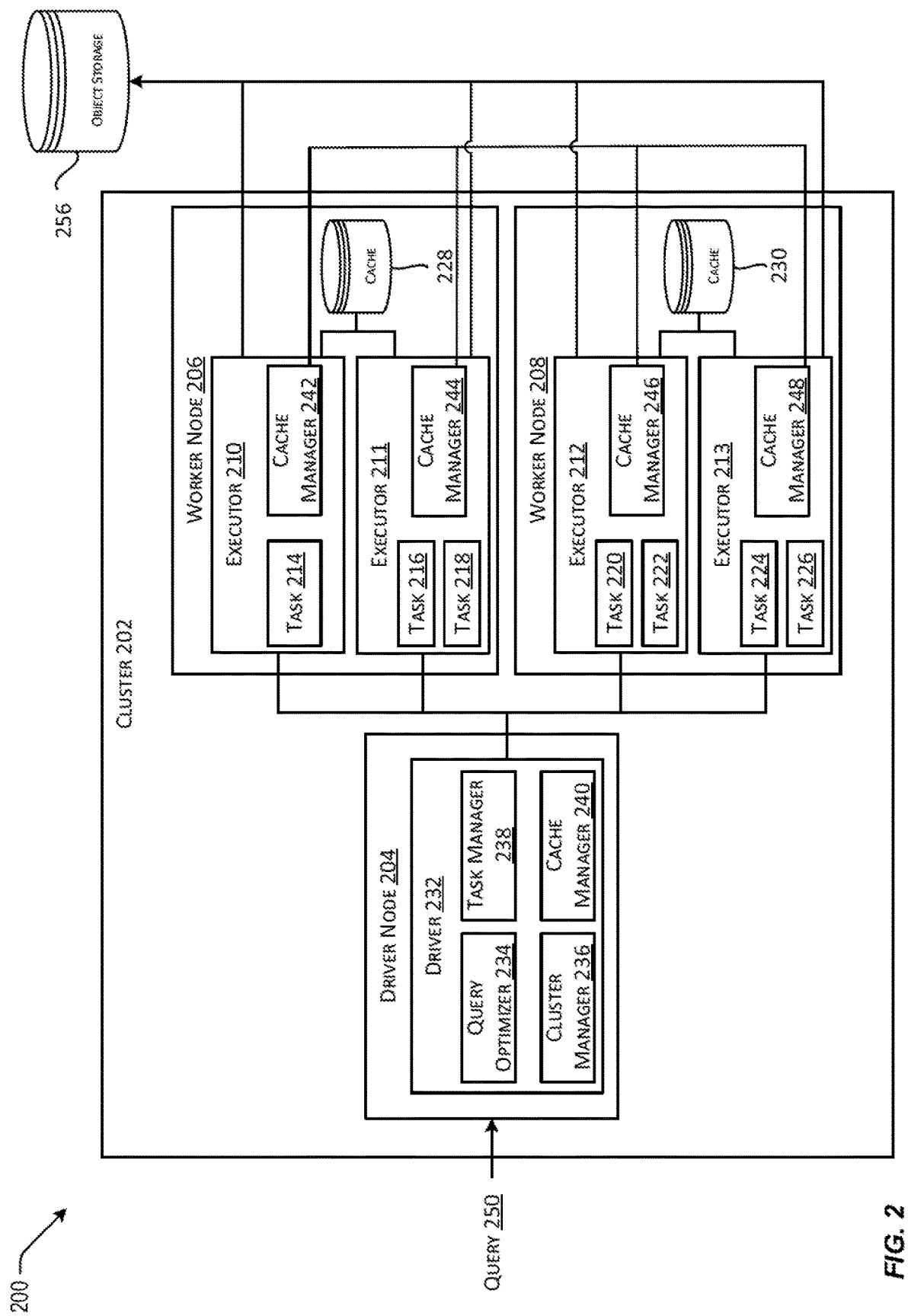
FIG. 2 illustrates a cluster of computing nodes in a distributed computing system implementing a deterministic caching technique, according to some embodiments.

FIG. 2 illustrates a cluster 202 of computing nodes in a distributed computing system 200 implementing a deterministic caching technique, according to some embodiments. The cluster 202 may be similar to cluster 122 described above with reference to FIG. 1. The cluster 202 may comprise a plurality of nodes, including driver node 204 and worker nodes 206, 208. A node within the cluster 202 may host any suitable number of executors (e.g., execution engines or execution processes) configured to perform operations corresponding to one or more tasks assigned to the nodes. As shown in FIG. 2, tasks can include tasks 214-226 assigned to executors 210-213. Worker node 206 utilizes two executors 210, 211, while worker node 208 utilizes two executors 212, 213. More or fewer nodes with more or fewer executors are possible in accordance with various embodiments. Each executor may additionally comprise executor memory, which may be a portion of the cache associated with the worker nodes. For example, executor 210 may have a portion of cache 228 as executor memory, while executor 211 has a second portion of cache 228 as executor memory. Similarly, executors 212, 213 operating on worker node 208 may utilize cache 230. The executors 210-213 may use the cache memory, e.g., caches 228, 230 to store data segments used in the tasks 214-226. The caches 228, 230 may be part of larger memory resources provided to the worker nodes 206, 208 to support additional data operations (e.g., splitting and shuffling data) that exceed dedicated memory resources for each executor.

As described previously, in some embodiments a driver node (e.g., driver node 204) may be configured to execute a driver 232 (also referred to as a driver program, driver module, driver process, i.e., the process running an application that is built on the computing cluster) and may execute operations to create an application's context. The application may be an analytical data processing application, such that the driver 232 can include a query optimizer 234 (e.g., Apache Spark Catalyst) for optimizing a query 250. The driver 204 can include a cluster manager 236 which allocates system resources to all the nodes in the cluster. The cluster manager 236 may be similar to cluster manager 126 described with respect to FIG. 1. The cluster manager 236 can be configured to maintain the state of the cluster. For example, the cluster state can include, without limitation, a mapping of worker nodes to executors and a mapping of token bounds to worker nodes. The cluster manager 236 can update the cluster state in response to indications that the cluster state has changed, for example, if a worker node fails. The cluster manager 236 may also update the cluster state when additional executors and/or worker nodes are provisioned within the cluster. The cluster manager 236 may communicate with an external cluster service, for example, a Kubernetes service (e.g., Kubernetes engine 146 of FIG. 1) to maintain the cluster state.

In some embodiments, the driver 204 may also include a task manager 238, which can be a scheduler for launching one or more tasks on executors in the cluster, for example tasks 214-226. Scheduling tasks may be based upon the query optimization provided by query optimizer 234. Tasks may be launched preferentially on executors based upon the consistent hashing technique described herein, such that tasks are launched at worker nodes having a cache containing a copy of the data segment to which the task corresponds. As an example, in response to query 250, task 214 may be scheduled at executor 210 operating on worker node 206 based at least in part on identifying that the data segment corresponding to task 214 has a hash token value lying within token bounds assigned to worker node 206. When executor 210 fetches the data segment, it may be likely that the data segment exists in local cache 228, resulting in a faster retrieval than if executor 210 had to fetch the data segment from object storage 256.

In some embodiments, the driver 204 may include a cache manager 240. The cache manager 240 may be configured to communicate with cache managers 242-248 operating on the executors 210-213. The cache managers may be configured to implement remote procedure call (RPC) endpoints to pass requests between the cache managers. For example, during execution of query 250, cache manager 246 may invoke a request to executors 210, 211 operating on the neighboring worker node 206 to examine the local cache 228 to identify the presence of the data segment required by either task 220 or task 222 on executor 212. The invocation of the request may be based at least in part on cache manager 246 determining that a hash token value for the data segment lies within token bounds assigned to worker node 206. In response to the RPC request, cache manager 242 may locate the data segment in cache 228, place the data segment in a block manager (e.g., a block storage or internode storage system within the distributed computing system), and return a block ID to the requesting cache manager 246. Executor 212 can then retrieve the data segment from the block manager and copy it into cache 230.

In some embodiments, the cache manager 240 can communicate with cache managers 242-248 to perform one or more housekeeping operations on the caches 228, 230. The housekeeping operations can include active operations to synchronize the data stored in the caches. The active housekeeping operations can occur in response to a change in the cluster state, for example, if nodes or executors are added or removed from the cluster. Additionally, the housekeeping operations can include passive operations to remove invalid data from the local caches and to evict infrequently used data from the caches to preserve cache space availability and reduce node resource utilization. Specific details of housekeeping operations are discussed more fully below with respect to FIGS. 5 and 6.

FIGS. 3A and 3B show snippets of code providing an example of a consistent hashing technique according to embodiments described herein. The particular language, style, and syntax of the code shown is not limiting on the present disclosure. One skilled in the art would recognize other languages and syntaxes to implement the described functionality.

FIG. 3A is a snippet of code 300 showing an example mapping of token bounds to nodes within a cluster, according to some embodiments. As depicted, the mapping represents a cluster including three worker nodes identified as "host_0," host_1," and "host_2." The worker nodes may be similar to other worker nodes described herein, including worker nodes 206, 208 of FIG. 2. The worker nodes are configured to host two executors, for a total of six executors in the cluster. In other embodiments, clusters may have one, two, or more than three worker nodes hosting any suitable number of executors. In those embodiments, the mapping of token bounds will be similar to that shown in FIG. 3A.

As described previously, token bounds can represent a partition of a set of integer values representing a set of token splits. For example, the integer values can be the integers from 0 to $2^{31}-1$ (that is to say, the size of a 32-bit signed integer). For the cluster corresponding to the mapping of FIG. 3A, the token bounds can partition the set of integer values into six contiguous subsets of token splits. Each worker node is mapped to two sets of "TokenBounds" corresponding to a range of token splits between the pair of integer token bounds. For example, host_1 is mapped to a first pair of token bounds 302, identified as "TokenBounds (0, 357913941)" and a second pair of token bounds 304, identified as "TokenBounds(715827882, 1073741823)." Although depicted with particular integer values for the described cluster configuration, other values may result from other embodiments of the present disclosure.

In some embodiments, a driver process of a driver node (e.g., driver 232 of driver node 204) may uniformly assign the token bounds to the worker nodes in a cluster. A uniform assignment of token bounds may balance the number of token splits assigned to each worker node, such that each worker node has a number of token bounds assigned to it based on the number of executors the worker node hosts. As shown in FIG. 3A, the three worker nodes are assigned two pairs of token bounds, one for each of the two executors configured on the worker nodes.

FIG. 3B is another snippet of code 310 showing another example mapping of token bounds to an updated set of nodes within a cluster, according to some embodiments. The updated set of nodes can be a result of an update of the nodes represented in FIG. 3A. As depicted, the example mapping now corresponds to a cluster with two worker nodes, host_0 and host_2. This mapping may result due to a failure of the host_1 node. In response to the change in the cluster state, the first pair of token bounds 302 previously assigned to host_1 may be reassigned by a driver node to the worker node corresponding to host_0. Similarly, the second pair of token bounds previously assigned to host_1 may be reassigned to the worker node corresponding to host_0. The result is two worker nodes with a uniform distribution of token splits.

In some embodiments, the token bounds are updated in response to a change in the cluster state. For example, if the worker node corresponding to host_1 in FIG. 3A fails, the driver node can update the token bounds to correspond to a cluster with four executors. The updated token bounds can then be assigned to the worker nodes remaining in the cluster. The token mapping will then have four pairs of token bounds, two each assigned to the two remaining worker nodes. Similarly, if worker nodes and/or executors are added to the cluster, the token bounds can be updated to correspond to the added executors and worker nodes.

Figure 4:
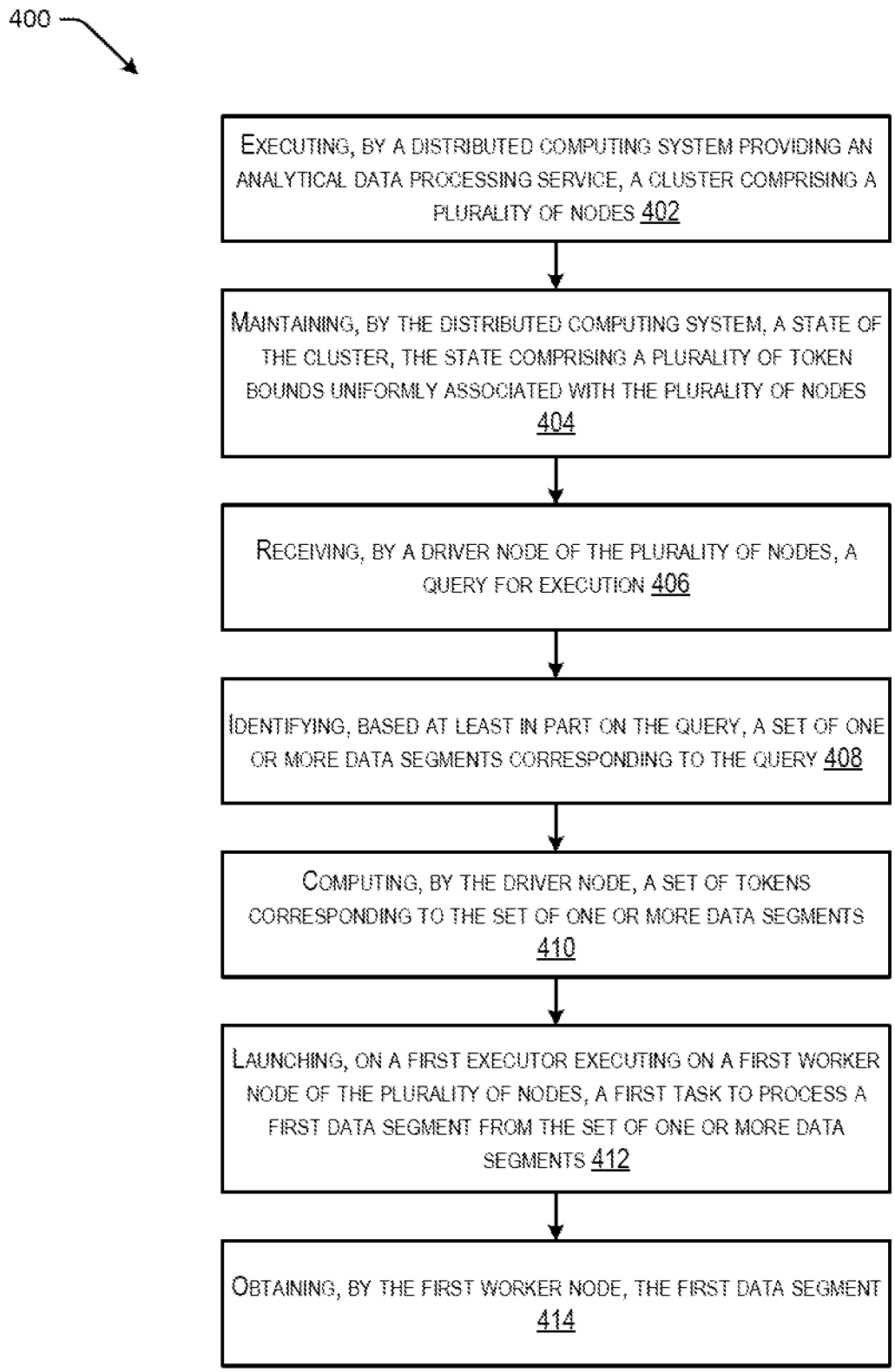
FIG. 4 is a simplified flow diagram of an example process for processing a query on a cluster with a deterministic cache, according to some embodiments.

FIG. 4 is a simplified flow diagram of an example process 400 for processing a query on a cluster with a deterministic cache, according to some embodiments. The cluster may be a cluster of a distributed computing system, including any of the distributed computing systems described herein, including cluster 202 of FIG. 2 and cluster 122 and distributed computing system 110 of FIG. 1. The process 400 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some, any, or all of the process 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Process 400 begins at block 402 with the distributed computing system (e.g., distributed computing system 110) executing a cluster (e.g., cluster 122 or cluster 202) comprising a plurality of nodes (e.g., driver node 204, worker nodes 206, 208). At block 404, the distributed computing system maintains a state of the cluster. The state of the cluster can include a mapping of one or more executors to the plurality of nodes and assigning, based on the mapping, a plurality of token bounds to the one or more executors executing on the plurality of nodes. Maintaining the state of the cluster can include updating the mapping in response to a change in the cluster state, for example, if nodes or executors are added or removed within the cluster. Maintaining the cluster state can also include updating the plurality of token bounds and assigning the updated token bounds uniformly to the one or more executors that are executing in the distributed computing system.

At block 406, the driver node can receive a query for execution. The query can be a query (e.g., query 250) sent by a user associated with a tenancy of the cluster. To execute the query, the driver node can identify a set of one or more data segments to be processed by the worker nodes of the cluster. The data segments can persist in a deep storage, for example, an offline storage, an object storage, or other similar storage system. According to certain embodiments, data segments may also be present at one or more caches associated with the worker nodes in the cluster.

At block 408, the driver node can compute a set of tokens corresponding to the set of one or more data segments. Each data segment can have a corresponding token that uniquely identifies the data segment. The tokens can be computed using a hashing algorithm, including MurmurHash3 or other suitable hashing algorithm. The input to the hashing algorithm can be identifying information associated with the data segments, for example, a filename.

At block 412, the driver node can, in conjunction with a task manager, scheduler, or other similar process executing at the driver node, launch a first task on a first executor executing at a first worker node. The first task can correspond to operations on a first data segment, such that the first executor can retrieve the first data segment, perform the requested operations, and complete the task. The first task may be one task in a plurality of tasks that constitute the query execution. The first worker node can be selected based at least in part on a first token of the set of tokens corresponding to a first pair of token bounds associated with the first worker node. For example, the hashing computation on the first data segment may return a particular integer value for the token. This value may fall within the range of integer values defined by the first pair of token bounds.

At block 414, the first worker node can retrieve the first data segment. The first data segment may be present in a cache associated with the first worker node. The first data segment may also be present at a cache associated with a second worker node in the cluster or be present in a data store, database, object storage, deep storage, or other repository remote from the node. Retrieving the first data segment from the cache associated with the first worker node can include the first executor identifying the first data segment in the cache and reading its contents into active memory. Retrieving the first data segment from the cache associated with the second worker node can include the first executor transmitting a request to one or more neighboring nodes of the plurality of nodes. Executors executing on the neighboring nodes can, based on the request, inspect caches associated with each of the neighboring nodes. A second executor executing on a second worker node of the one or more neighboring nodes can determine that the first data segment is present in the second cache, place that data segment in a block manager (associated with, for example, a block storage or internode storage system) or other module configured to handle data transfer between nodes in the distributed computing system, and then transmit the identity of the first data segment to the first executor that made the request. The first worker node can then copy the data segment from the second worker node to the first cache associated with the first worker node.

Figure 5:
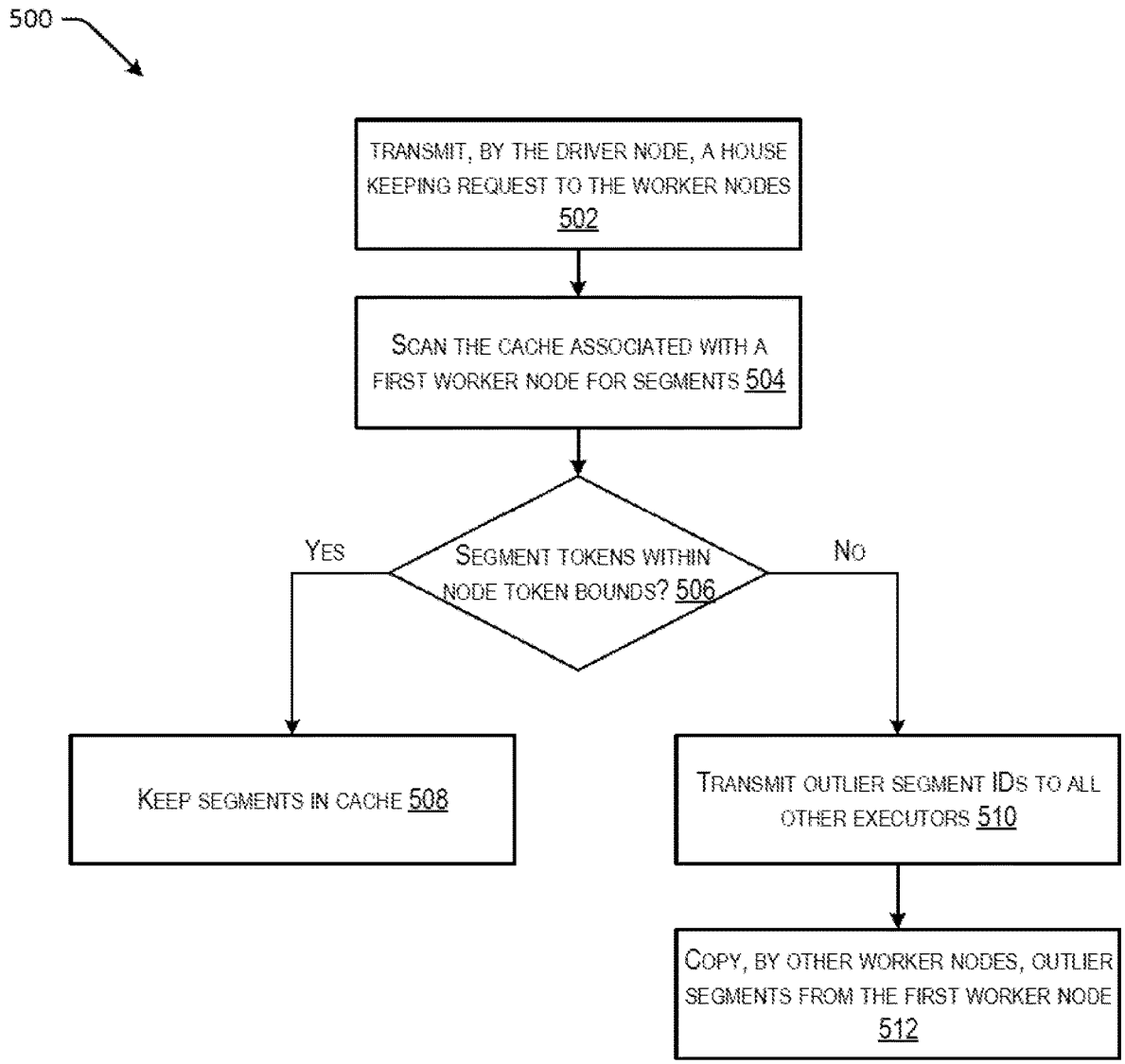
FIG. 5 is another simplified flow diagram of an example process for stabilizing a deterministic cache within a cluster when the cluster state changes, according to some embodiments.

FIG. 5 is another simplified flow diagram of an example process 500 for stabilizing a deterministic cache within a cluster when the cluster state changes, according to some embodiments. The cluster may be a cluster of a distributed computing system, including any of the distributed computing systems described herein, including cluster 202 of FIG. 2 and cluster 122 and distributed computing system 110 of FIG. 1.

The process 500 may begin at block 502 with a driver node (e.g., driver node 232) transmitting a house keeping request to one or more worker nodes (e.g., worker nodes 206, 208) in the cluster. The house keeping request may be generated and transmitted in response to a change in the state of the cluster, for example, the addition or removal of a worker node or an executor. When the state of the cluster changes, the new configuration can affect the location of cached data segments within the cluster. Performing housekeeping operations may stabilize the cache actively.

In response to the house keeping request, at block 504, one or more executors operating on the worker nodes can scan the cache associated with the worker nodes for data segments. For example, a first executor executing at a first worker node can scan the cache associated with the first worker node to identify data segments. Similarly, a different executor executing on the first worker node can also scan the cache associated with the first worker node to identify data segments. Since the cache on the first worker node is shared by the first executor and the different executor, each executor may scan all the data segments in the cache to determine whether the data segments correspond to pairs of token bounds that have been assigned to the executors.

At decision 506, the executors evaluate whether tokens associated with the scanned data segments fall within the token bounds assigned to the executors. For example, the first executor may be assigned a first pair of token bounds that defines a range of token values that are "owned" by the executor. When scanning the cache associated with the first worker node, the first executor can determine if the tokens for the data segments present correspond to the values in the first executor's token bounds. The executors can compute the token values using the same hashing algorithm used by the driver node when executing the query. In some embodiments, the token values can be passed to the executors by the driver node as part of a hashed segment key table of tokens. If the data segment tokens are within the executors' token bounds, then the segments are kept in the cache. If the data segment tokens are not within the executors' token bounds, then the executors transmit segment IDs to all other executors in the cluster, at block 510.

At block 512, executors that receive outlier segment IDs can copy outlier segments from other worker nodes to the local cache. For example, the first executor may identify one or more outlier data segments in the cache associated with the first worker node. Based on the current state of the cluster and the current assignment of token bounds, one or more of these outlier data segments may be "owned" by a second executor at a second worker node. The second worker node can copy the data segments from the first worker node to the cache associated with the second worker node. In this way, data segments may be present in the expected cache according to the state of the cluster, and the cache may be stabilized after changes to the state of the cluster.

Figure 6:
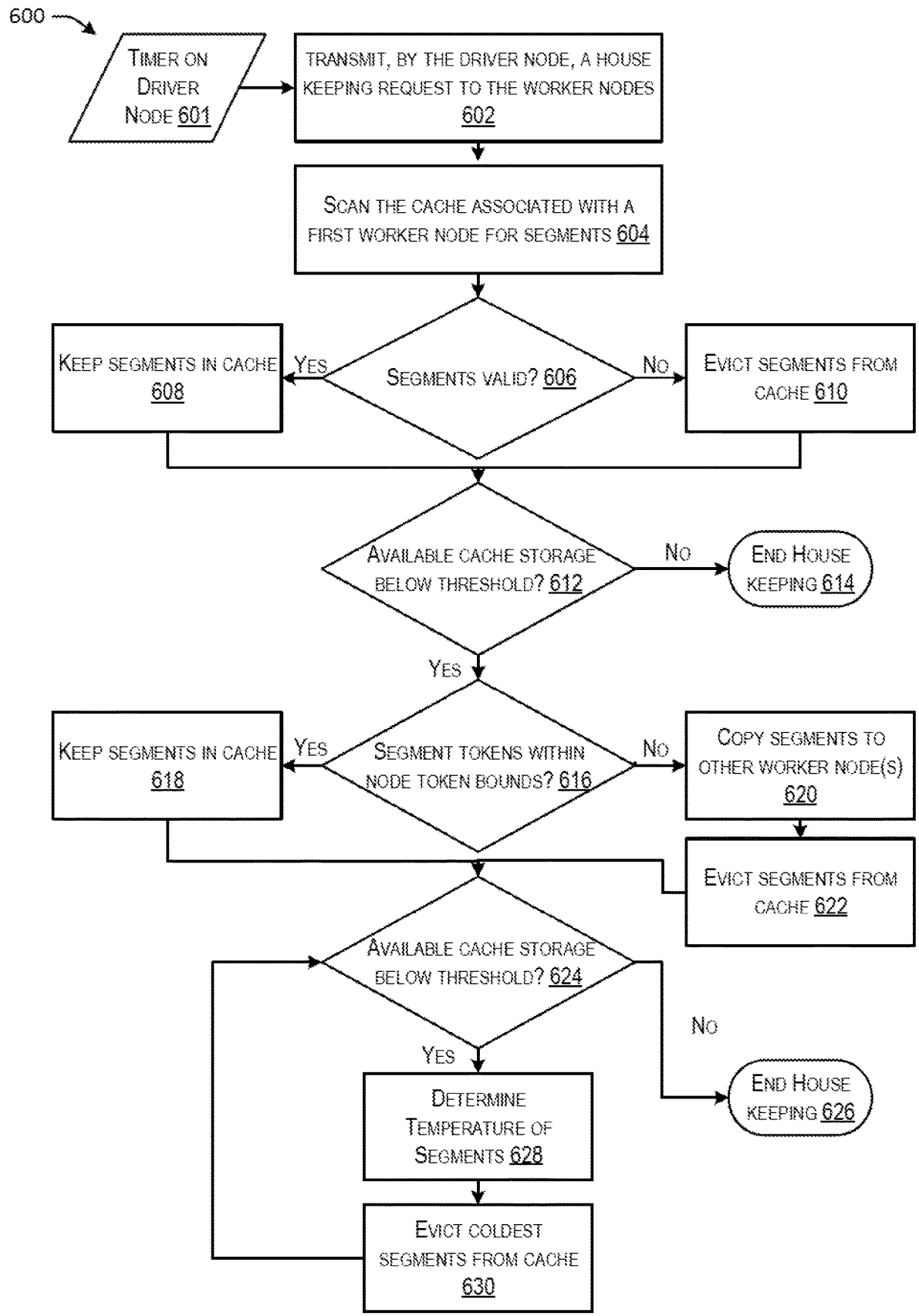
FIG. 6 is yet another simplified flow diagram of an example process for cleaning a deterministic cache according to a timer process.

FIG. 6 is a simplified flow diagram of an example process 600 for cleaning a deterministic cache according to a timer process. The cluster may be a cluster of a distributed computing system, including any of the distributed computing systems described herein, including cluster 202 of FIG. 2 and cluster 122 and distributed computing system 110 of FIG. 1. The process 600 may represent "passive" housekeeping operations that complement the "active" housekeeping operations described above with respect to FIG. 5.

At input 601, a driver node (e.g., driver node 232) can receive a timer indication from a timer process implemented on the driver node. The timer may be configured to trigger operations of process 600 according to a fixed schedule. In some embodiments, the timer intervals can vary according to cluster parameters or other conditions related to the cluster (e.g., cluster load, cluster state, etc.). In response to the timer, at block 602 the driver node can transmit a house keeping request to one or more worker nodes (e.g., worker nodes 206, 208) in the cluster. The house keeping request may reduce resource usage in the cluster by "cleaning" the distributed cache in order to remove invalid data segments and infrequently accessed data segments.

In response to the house keeping request, at block 604 one or more executors operating on the worker nodes can scan the cache associated with the worker nodes for data segments, similar to block 504 of FIG. 5. At decision 606, the one or more executors evaluate whether the data segments in the cache are valid. During query execution, data segments may be updated or otherwise modified, such that the cached data segments no longer represent the current data stored in object storage. Data segments in the distributed cache that are no longer consistent with the data in the object storage are invalid but may persist in the cache until removed. To determine whether the cached data segments are valid, the one or more executors can build a valid segment list for each data cube in the object storage. Based on the valid segment list, the one or more executors can determine whether the cached data segments are valid. If the data segments are valid, then they are kept in the cache, at block 608. If the data segments are invalid, they are evicted (e.g., deleted) from the cache, at block 610.

At decision 612, the driver node can determine whether the available cache storage falls below a threshold. In some embodiments, the determination that the available storage falls below a threshold may be made by the one or more executors or cache managers executing on the nodes. In some embodiments, the threshold may be configured as part of the cluster configuration and may be, for example, 80% of total configured space in the cache. If the available cache space is above the threshold, the house keeping operation may end at endpoint 614.

If the available cache storage space falls below the threshold, then the process 600 can move to decision 616. Similar to operations described with respect to FIG. 5, at decision 616, the one or more executors can evaluate whether tokens associated with the scanned data segments fall within the token bounds assigned to the executors. If so, then the segments are kept in the cache, at block 618. If not, then the outlier segments may be copied to other worker nodes in the cluster according to the current assignment of token bounds, at block 620. At block 622, outlier data segments may be evicted from the local cache. The eviction may occur after the data segments have been copied to another worker node.

At decision 624, the available cache storage space is checked again to determine if it falls below a threshold, similar to decision 612. If the available space is above the threshold, then the house keeping operations can end at endpoint 626. If the cache still has space constraints because the available space is below the configured threshold, then a third technique may be employed to clean the cache. At block 628, the one or more executors can determine a temperature of the data segments stored in the distributed cache. As used herein, "temperature" refers to a measure of the frequency of access to a data segment in the cache, such that a "hot" data segment is accessed frequently over time by various queries executed by the cluster. By contrast, a "cold" data segment has resided in the cache with infrequent access. In some embodiments, the temperature of segments can be categorized as "hot," "mild," or "cold." The temperature may be determined by computing the interval between previous accesses of the data segment. If the interval is decreasing (e.g., more frequent reads more recently) then the temperature level for that segment is upgraded (e.g., from cold to mild or from mild to hot). If the interval is increasing (e.g., less frequent reads more recently) then the temperature level for that segment is downgraded (e.g., hot to mild or mild to cold). For example, the data segment may have been first accessed in cache 10 seconds ago, accessed a second time 5 seconds ago, and accessed a third time 2 seconds ago. As such, the last access interval is decreasing, so the temperature of the segment can be upgraded (e.g., from mild to hot).

Based on the temperature of the segments in the cache, at block 630, the one or more executors can evict the coldest segments from the cache. In some embodiments, this may mean evicting one, some, or all of the data segments that have a "cold" temperature. After evicting the coldest data segments, the available cache space is checked again. The process of evicting the coldest data segments repeats until the available cache space is above the threshold.

In some embodiments, additional statistics of the data segments may be maintained, including, but not limited to, cache hits, cache misses, number of invalidations, size, average access interval, replication factor, and whether the segment was retrieved from object storage or an internode storage. In addition to temperature for determining which data segments to evict from the cache, other combinations of data segment statistic values may be used.

Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model may require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing desired libraries or services on them. In most cases, deployment does not include provisioning, and the provisioning may be desired to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, it may be desired that the infrastructure on which the code will be deployed is set up first. In some instances, the provisioning can be done manually, a provisioning tool may be utilized to provision the resources, and/or deployment tools may be utilized to deploy the code once the infrastructure is provisioned.

Figure 7:
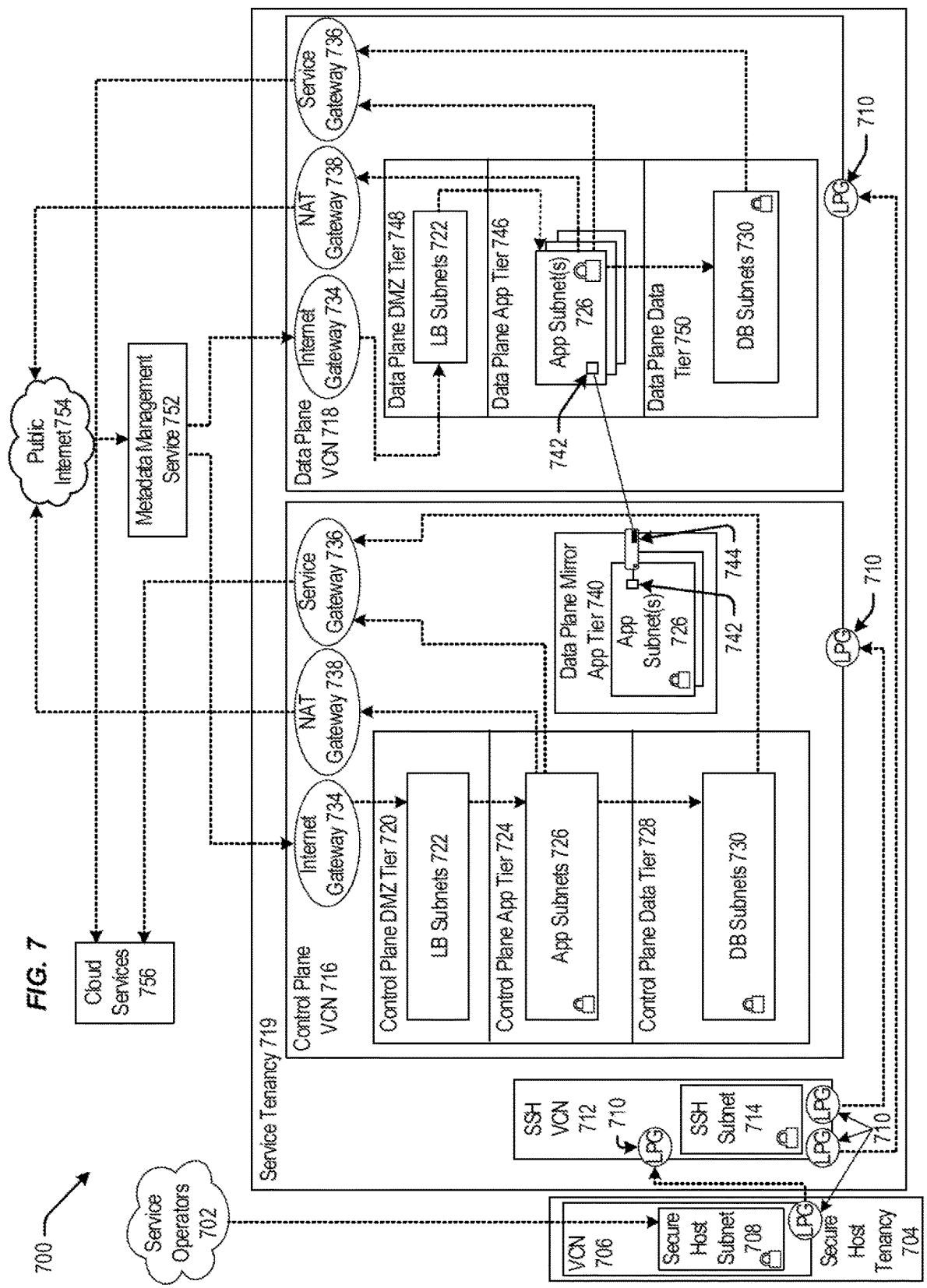
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
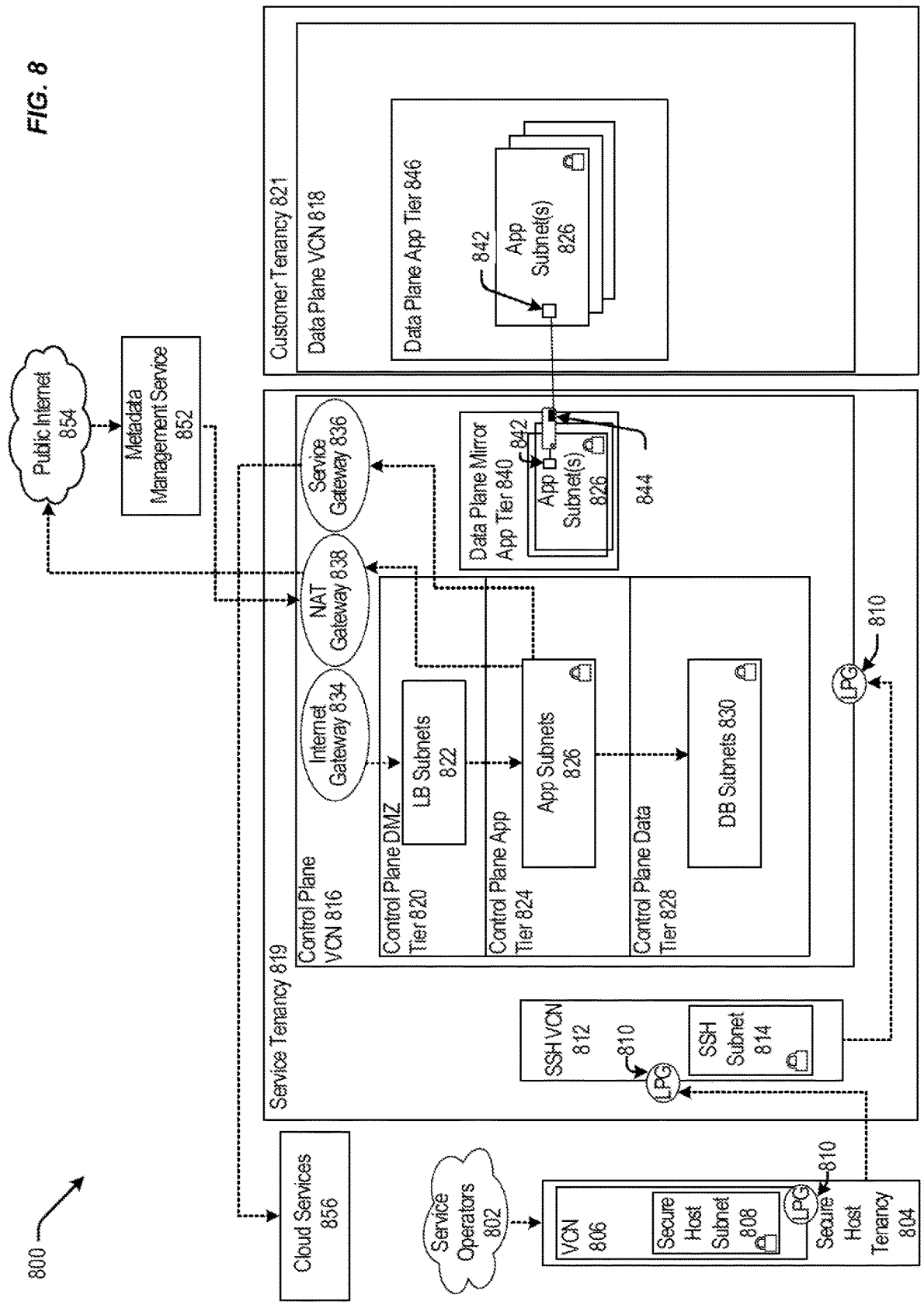
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
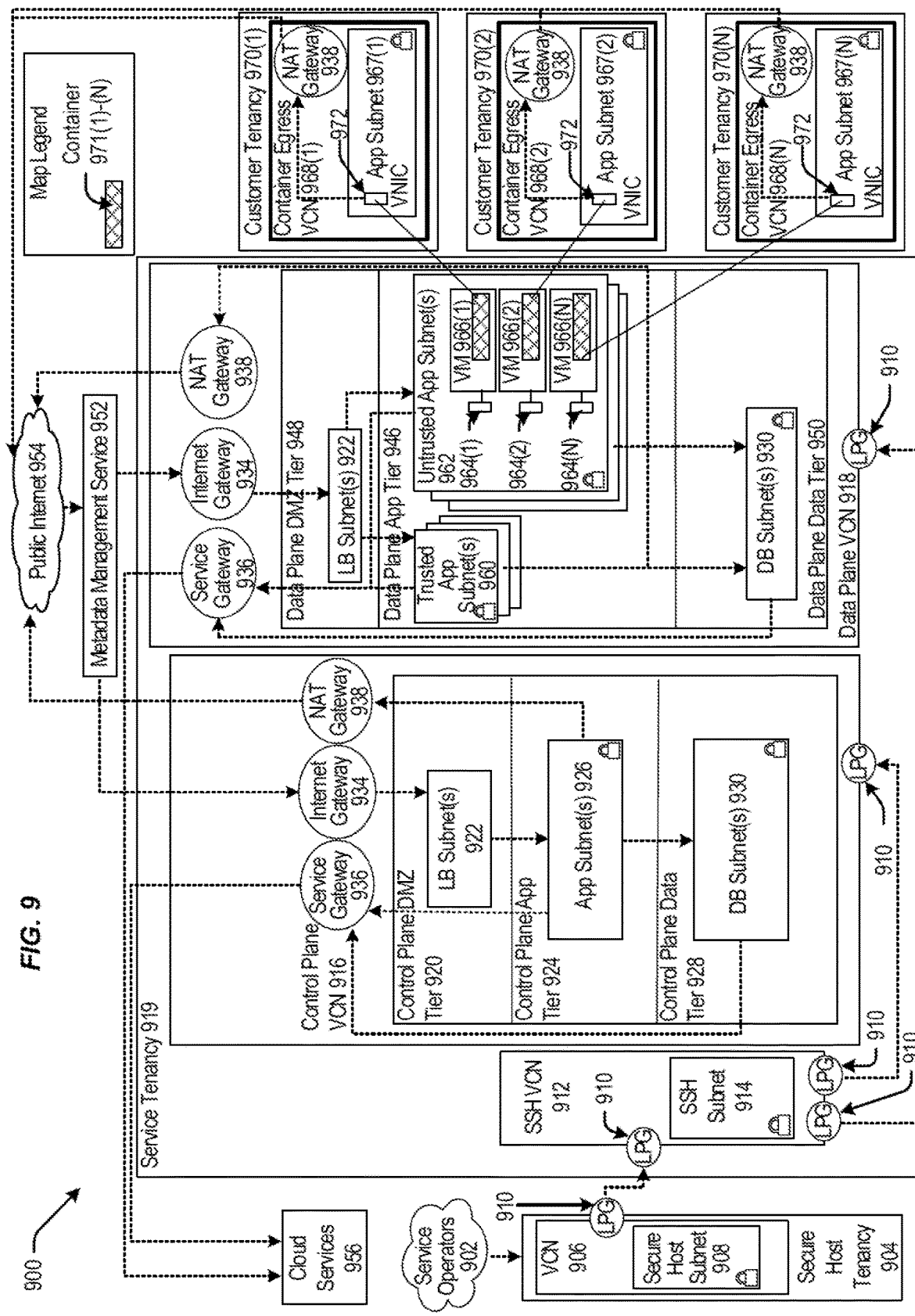
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
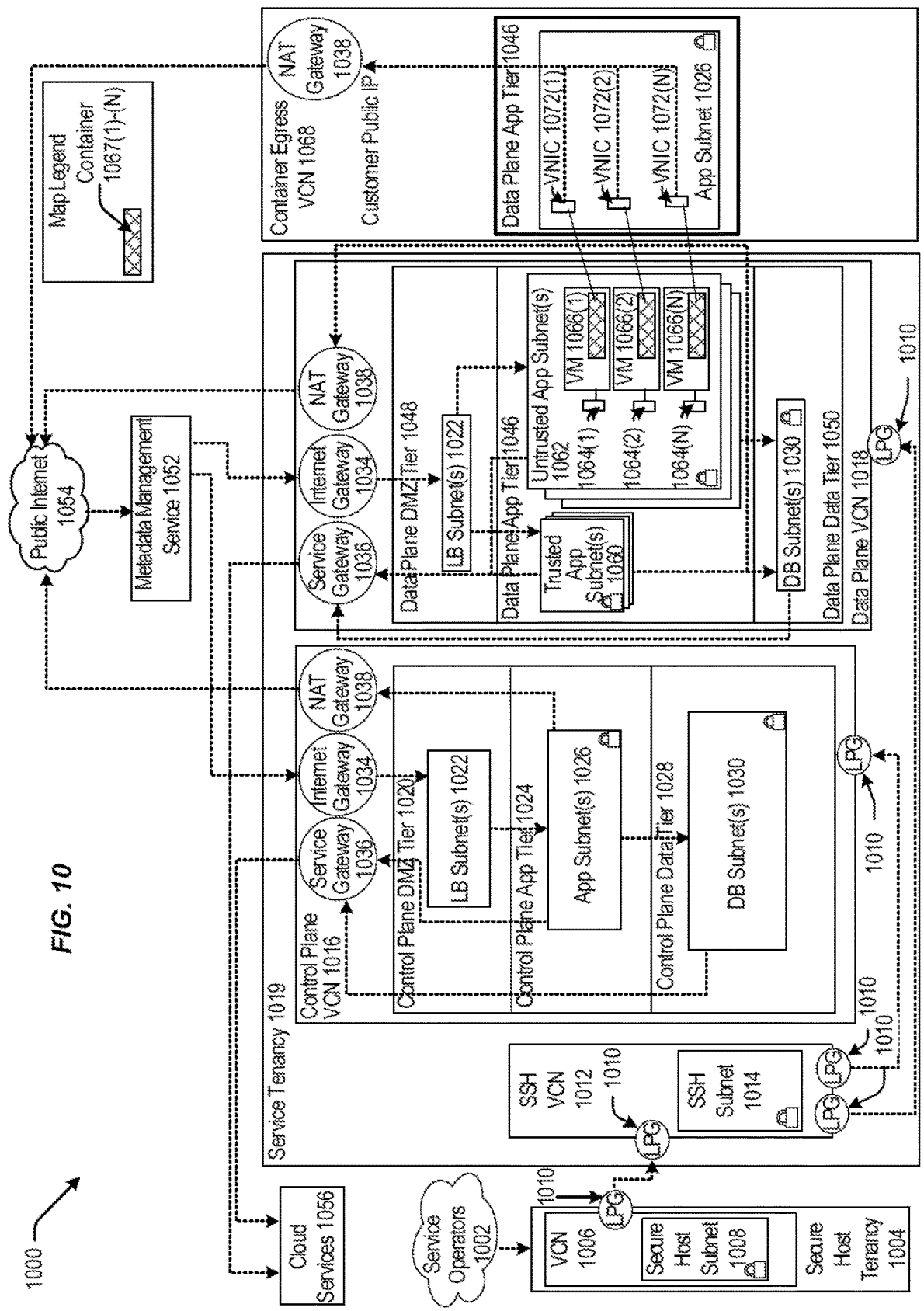
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
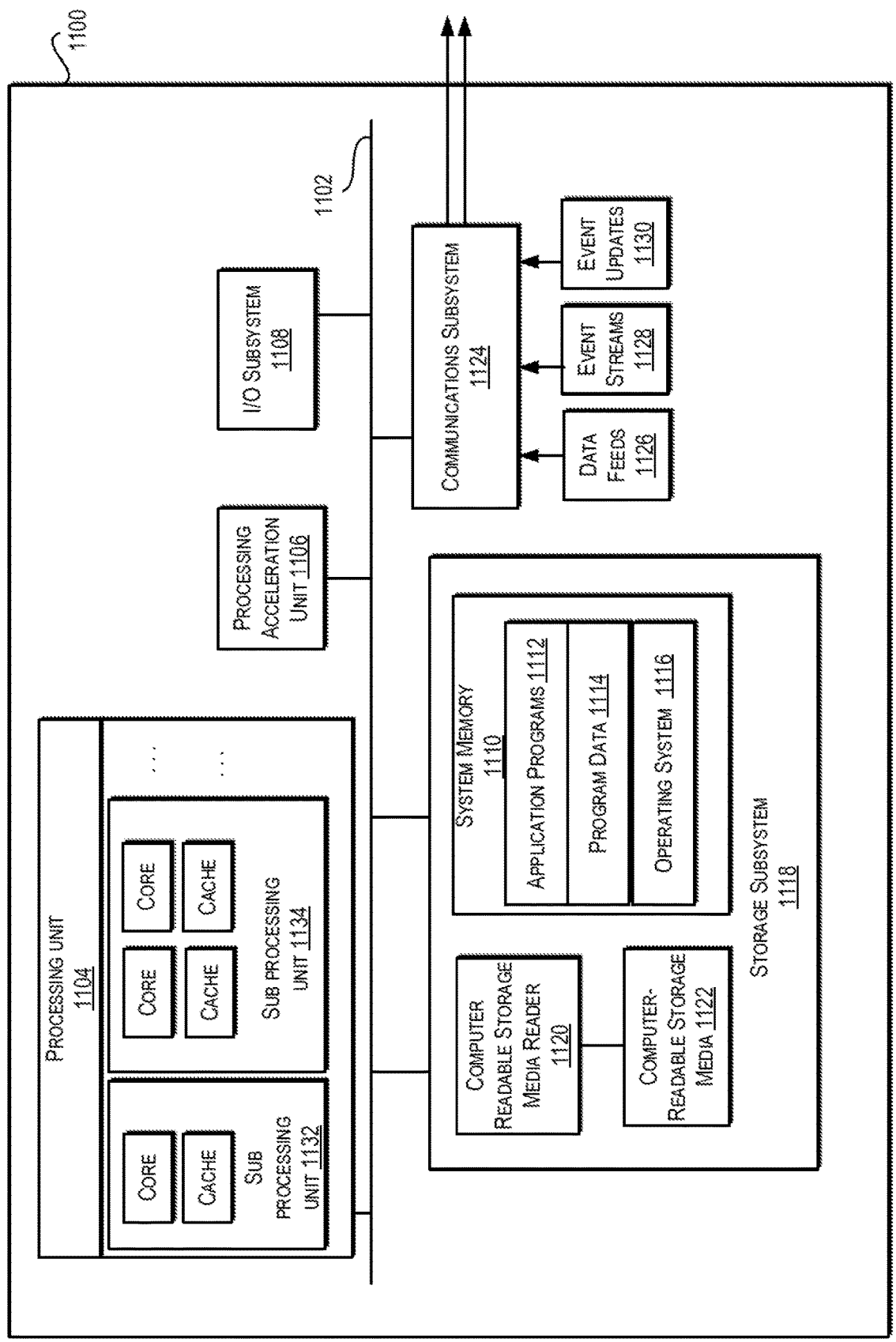
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   executing, by a distributed computing system providing an analytical data processing service, a cluster comprising a plurality of nodes;
   maintaining, by the distributed computing system, a state of the cluster, the state comprising a plurality of token bounds uniformly associated with the plurality of nodes;
   receiving, by a driver node of the plurality of nodes, a query for execution;
   identifying, based at least in part on the query, a set of one or more data segments corresponding to the query;
   computing, by the driver node, a set of tokens corresponding to the set of one or more data segments;
   launching, on a first executor executing on a first worker node of the plurality of nodes, a first task to process a first data segment from the set of one or more data segments, the first worker node selected based at least in part on a first token of the set of tokens corresponding to a first pair of token bounds of the plurality of token bounds, the first pair of token bounds associated with the first worker node based at least on a uniform distribution of the plurality of token bounds to one or more executors of the plurality of nodes; and
   obtaining, by the first worker node, the first data segment from a distributed cache within the cluster, the distributed cache characterized by the plurality of token bounds uniformly associated with the plurality of nodes of the cluster.

2. The computer-implemented method of claim 1, wherein maintaining the state of the cluster comprises:
storing a mapping of one or more executors to the plurality of nodes; and
assigning, based at least in part on the mapping, the plurality of token bounds to the one or more executors executing on the plurality of nodes, the plurality of token bounds distributed uniformly to the one or more executors, the first pair of token bounds of the plurality of token bounds assigned to a first executor of the one or more executors.

3. The computer-implemented method of claim 2, further comprising:
receiving, by the driver node, an indication that the cluster has been modified;
responsive to the indication, updating the plurality of token bounds; and
assigning the updated plurality of token bounds to the one or more executors, the updated plurality of token bounds distributed uniformly to the one or more executors.

4. The computer-implemented method of claim 1, wherein obtaining the first data segment comprises determining, by the first executor, that the first data segment is present in a first cache associated with the first worker node and reading the first data segment from the first cache.

5. The computer-implemented method of claim 1, wherein obtaining the first data segment comprises:
determining, by the first executor, that the first data segment is not present in a first cache associated with the first worker node;
transmitting a request to one or more neighboring nodes of the plurality of nodes;
responsive to the request, determining, by a second executor executing on a second worker node of the one or more neighboring nodes, that the first data segment is present in a second cache associated with the second worker node;
copying, by the first worker node, the first data segment from the second cache to the first cache; and
reading the first data segment from the first cache.

6. The computer-implemented method of claim 1, wherein computing the set of tokens comprises computing hash values that uniquely identify the one or more data segments.

7. The computer-implemented method of claim 6, wherein the plurality of token bounds comprise a plurality of integer values that partition a range of integer token values, the computed hash values lying in the range of integer token values.

8. The computer-implemented method of claim 1, further comprising:
transmitting, by the driver node, a house keeping request to the first worker node;
responsive to the house keeping request, determining, by the first executor, one or more outlier data segments present in a first cache associated with the first worker node, the one or more outlier data segments determined based at least in part on one or more tokens of the set of tokens corresponding to the one or more outlier data segments lying outside the first pair of token bounds assigned to the first executor;
transmitting, by the first executor, an identifier of the one or more outlier data segments to the plurality of nodes; and
copying, by a second worker node of the plurality of nodes and based at least in part on the identifier, the one or more outlier data segments to a second cache associated with the second worker node.

9. The computer-implemented method of claim 1, further comprising:
transmitting, by the driver node, a house keeping request to the first worker node;
responsive to the house keeping request, determining, by the first executor, a set of valid data segments;
determining, based at least in part on the set of valid data segments, one or more invalid data segments present in a first cache associated with the first worker node;
evicting the one or more invalid data segments from the first cache;
determining, by the first worker node, a current storage availability associated with the first worker node; and
if the current storage availability falls below a threshold:
determining, by the first executor, one or more target data segments present in the first cache; and
evicting the target data segments.

10. The computer-implemented method of claim 9, wherein the one or more target data segments are determined based at least in part on a set of segment temperatures.

11. A distributed computing system providing an analytical data processing service comprising:
one or more processors; and
one or more memories storing computer-executable instructions that, when executed with the one or more processors, cause the distributed computing system to:
execute a cluster comprising a plurality of nodes;
maintain a state of the cluster, the state comprising a plurality of token bounds uniformly associated with the plurality of nodes;
receive, by a driver node of the plurality of nodes, a query for execution;
identify, based at least in part on the query, a set of one or more data segments corresponding to the query;
compute, by the driver node, a set of tokens corresponding to the set of one or more data segments;
launch, on a first executor executing on a first worker node of the plurality of nodes, a first task to process a first data segment from the set of one or more data segments, the first worker node selected based at least in part on a first token of the set of tokens corresponding to a first pair of token bounds of the plurality of token bounds, the first pair of token bounds associated with the first worker node based at least on a uniform distribution of the plurality of token bounds to one or more executors of the plurality of nodes; and
obtain, by the first worker node, the first data segment from a distributed cache within the cluster, the distributed cache characterized by the plurality of token bounds uniformly associated with the plurality of nodes of the cluster.

12. The distributed computing system of claim 11, wherein maintaining the state of the cluster comprises:
storing a mapping of one or more executors to the plurality of nodes; and
assigning, based at least in part on the mapping, the plurality of token bounds to the one or more executors executing on the plurality of nodes, the plurality of token bounds distributed uniformly to the one or more executors, the first pair of token bounds of the plurality of token bounds assigned to a first executor of the one or more executors.

13. The distributed computing system of claim 12, wherein executing the computer-executable instructions further causes the distributed computing system to:
receive, by the driver node, an indication that the cluster has been modified;
responsive to the indication, update the plurality of token bounds; and
assign the updated plurality of token bounds to the one or more executors, the updated plurality of token bounds distributed uniformly to the one or more executors.

14. The distributed computing system of claim 11, wherein obtaining the first data segment comprises determining, by the first executor, that the first data segment is present in a first cache associated with the first worker node and reading the first data segment from the first cache.

15. The distributed computing system of claim 11, wherein obtaining the first data segment comprises:
determining, by the first executor, that the first data segment is not present in a first cache associated with the first worker node;
transmitting a request to one or more neighboring nodes of the plurality of nodes;
responsive to the request, determining, by a second executor executing on a second worker node of the one or more neighboring nodes, that the first data segment is present in a second cache associated with the second worker node;
copying, by the first worker node, the first data segment from the second cache to the first cache; and
reading the first data segment from the first cache.

16. A non-transitory computer readable medium storing computer-executable instructions that, when executed by one or more processors, cause a distributed computer system to at least:
execute a cluster comprising a plurality of nodes;
maintain a state of the cluster, the state comprising a plurality of token bounds uniformly associated with the plurality of nodes;
receive, by a driver node of the plurality of nodes, a query for execution;
identify, based at least in part on the query, a set of one or more data segments corresponding to the query;
compute, by the driver node, a set of tokens corresponding to the set of one or more data segments;
launch, on a first executor executing on a first worker node of the plurality of nodes, a first task to process a first data segment from the set of one or more data segments, the first worker node selected based at least in part on a first token of the set of tokens corresponding to a first pair of token bounds of the plurality of token bounds, the first pair of token bounds associated with the first worker node based at least on a uniform distribution of the plurality of token bounds to one or more executors of the plurality of nodes; and
obtain, by the first worker node, the first data segment from a distributed cache within the cluster, the distributed cache characterized by the plurality of token bounds uniformly associated with the plurality of nodes of the cluster.

17. The non-transitory computer readable medium of claim 16, wherein maintaining the state of the cluster comprises:
storing a mapping of one or more executors to the plurality of nodes; and
assigning, based at least in part on the mapping, the plurality of token bounds to the one or more executors executing on the plurality of nodes, the plurality of token bounds distributed uniformly to the one or more executors, the first pair of token bounds of the plurality of token bounds assigned to a first executor of the one or more executors.

18. The non-transitory computer readable medium of claim 17, wherein executing the computer-executable instructions further causes the distributed computing system to:
receive, by the driver node, an indication that the cluster has been modified;
responsive to the indication, update the plurality of token bounds; and
assign the updated plurality of token bounds to the one or more executors, the updated plurality of token bounds distributed uniformly to the one or more executors.

19. The non-transitory computer readable medium of claim 16, wherein obtaining the first data segment comprises determining, by the first executor, that the first data segment is present in a first cache associated with the first worker node and reading the first data segment from the first cache.

20. The non-transitory computer readable medium of claim 16, wherein obtaining the first data segment comprises:
determining, by the first executor, that the first data segment is not present in a first cache associated with the first worker node;
transmitting a request to one or more neighboring nodes of the plurality of nodes;
responsive to the request, determining, by a second executor executing on a second worker node of the one or more neighboring nodes, that the first data segment is present in a second cache associated with the second worker node;
copying, by the first worker node, the first data segment from the second cache to the first cache; and
reading the first data segment from the first cache.

* * * * *